US012676918B2

(12) United States Patent
Pittner

(10) Patent No.: US 12,676,918 B2
(45) Date of Patent: Jul. 7, 2026

(54) ADAPTIVE LOG COMPRESSION

(71) Applicant: International Business Machines Corporation, Armonk, NY (US)

(72) Inventor: Daniel Pittner, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 18/430,742

(22) Filed: Feb. 2, 2024

(65) Prior Publication Data

US 2025/0202997 A1 Jun. 19, 2025

(30) Foreign Application Priority Data

Dec. 19, 2023 (GB) ..................................... 2319497

(51) Int. Cl.
H04L 69/04 (2022.01)
(52) U.S. Cl.
CPC .................................. H04L 69/04 (2013.01)
(58) Field of Classification Search
CPC .................................. H04L 69/04; G06F 17/40
See application file for complete search history.

(56) References Cited

U.S. PATENT DOCUMENTS

| 5,956,735 A | 9/1999 | Clark et al. |
| 6,275,826 B1 | 8/2001 | Geiner et al. |

| 9,031,997 B2 | 5/2015 | Chelliah |
| 10,187,081 B1 * | 1/2019 | Diamant ............. H03M 7/3088 |
| 10,469,101 B2 | 11/2019 | Ozaki |
| 11,436,196 B2 | 9/2022 | Shi et al. |
| 2005/0138483 A1 | 6/2005 | Hatonen |
| 2009/0037448 A1 * | 2/2009 | Thomas ............. H03M 7/3084 |

(Continued)

FOREIGN PATENT DOCUMENTS

| CN | 113377553 A | 9/2021 |
| CN | 114968954 A | 8/2022 |

(Continued)

OTHER PUBLICATIONS

United Kingdom Patent Office, "Search Report," Jun. 10, 2024, 3 Pages, Application No. 2319497.0.

(Continued)

*Primary Examiner* — Christopher B Robinson
*Assistant Examiner* — Ho T Shiu
(74) *Attorney, Agent, or Firm* — Anthony M. Pallone

(57) ABSTRACT

According to one embodiment, a method, computer system, and computer program product for log compression is provided. The embodiment comprises receiving a log stream from an instance of an application executed within a container of a remote computational system via a network connection. The log stream comprises metadata. The metadata comprises an application identifier. The application identifier uniquely identifies the executable code of the application. The embodiment further comprises searching a compression dictionary library for a current compression dictionary using the application identifier. The application identifier uniquely identifies the current compression dictionary for the application. The embodiment further comprises sending the current compression dictionary to the remote computational system via the network connection.

16 Claims, 4 Drawing Sheets

(56)          References Cited

U.S. PATENT DOCUMENTS

| | | | | |
|---|---|---|---|---|
| 2011/0158307 | A1* | 6/2011 | Lee | H03M 7/6052 |
| | | | | 375/240 |
| 2013/0262487 | A1 | 10/2013 | Yamashita et al. | |
| 2021/0321351 | A1* | 10/2021 | Kim | H04W 72/0446 |
| 2022/0094767 | A1* | 3/2022 | Lehmann | H03M 7/3088 |
| 2022/0224354 | A1* | 7/2022 | Micou | H04L 69/04 |
| 2022/0261306 | A1* | 8/2022 | Chandrasekaran | |
| | | | | G06F 11/1438 |

FOREIGN PATENT DOCUMENTS

| | | | |
|---|---|---|---|
| CN | 116277926 | A | 6/2023 |
| CN | 116340274 | A | 6/2023 |
| GB | 2636709 | A | 7/2025 |
| WO | 2025/131645 | A1 | 6/2025 |

OTHER PUBLICATIONS

Christensen et al., "Adaptive Log Compression for Massive Log Data", ACM, SIGMOD '13: Proceedings of the 2013 ACM SIGMOD International Conference on Management of Data, New York, New York, USA, Jun. 22-27, 2013, 1 Page.

Feng et al., "MLC: An Efficient Multi-level Log Compression Method for Cloud Backup Systems", IEEE, 2016 IEEE TrustCom/BigDataSE/ISPA, Tianjin, China, Aug. 23-26, 2016, 8 Pages.

Lin et al., "Cowic: A Column-Wise Independent Compression for Log Stream Analysis", IEEE, 2015 15th IEEE/ACM International Symposium on Cluster, Cloud and Grid Computing, Shenzhen, China, May 4-7, 2015, 10 Pages.

Wei et al., "LogGrep: Fast and Cheap Cloud Log Storage by Exploiting both Static and Runtime Patterns", ACM, In Eighteenth European Conference on Computer Systems (EuroSys '23), Rome, Italy, May 8-12, 2023, 17 Pages.

Github—Facebook, "Zstandard—Real Time Data Compression Algorithm", May 12, 2025, 13 pages, http://facebook.github.io/zstd/#small-data.

International Searching Authority, "Notification of Transmittal of the International Search Report and the Written Opinion of the International Searching Authority, or Declaration," Patent Cooperation Treaty May 8, 2025, 20 pages, International Application No. PCT/EP2024/084320.

* cited by examiner

100

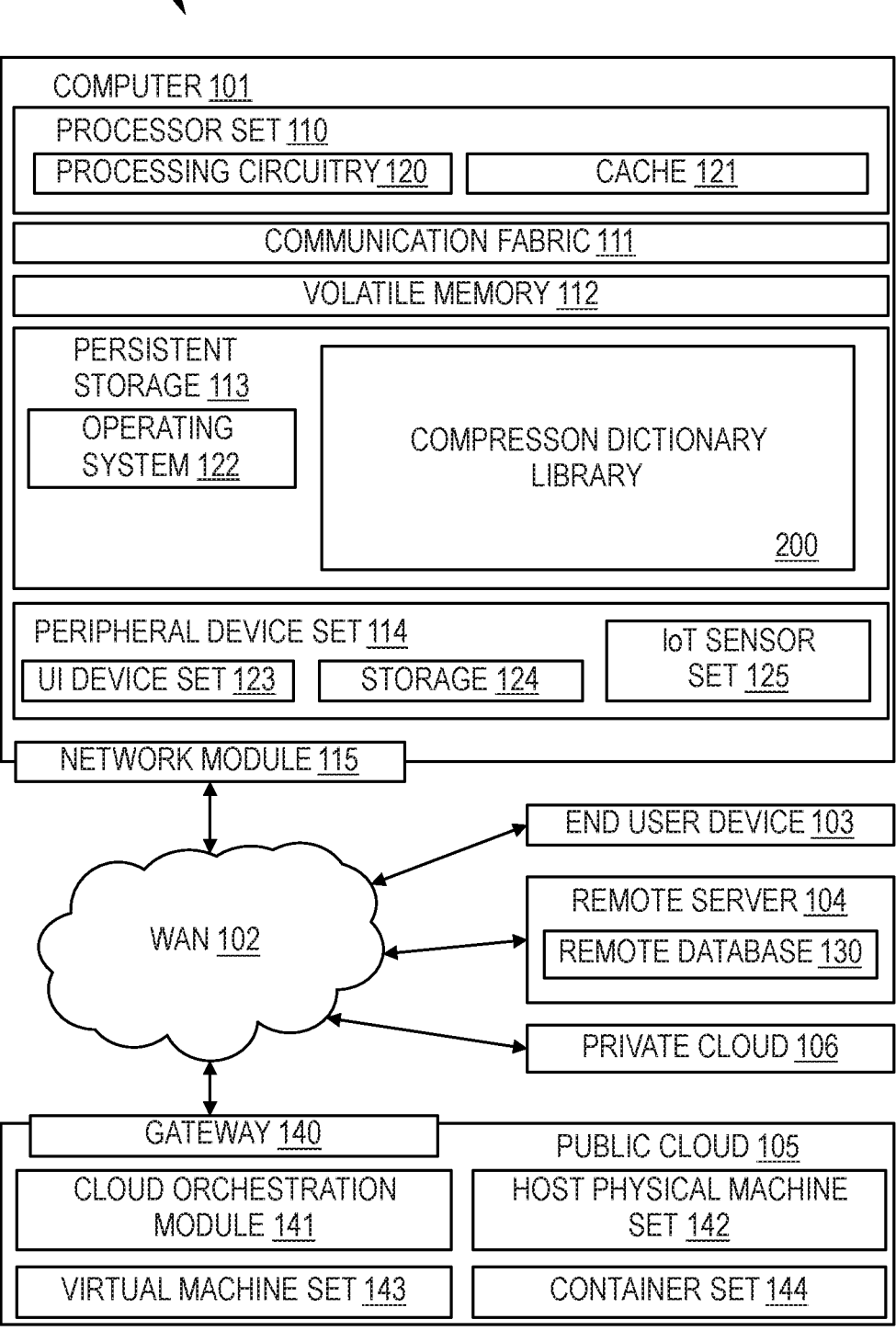

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

COMPRESSON DICTIONARY LIBRARY

200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140    PUBLIC CLOUD 105

CLOUD ORCHESTRATION MODULE 141    HOST PHYSICAL MACHINE SET 142

VIRTUAL MACHINE SET 143    CONTAINER SET 144

Fig. 1

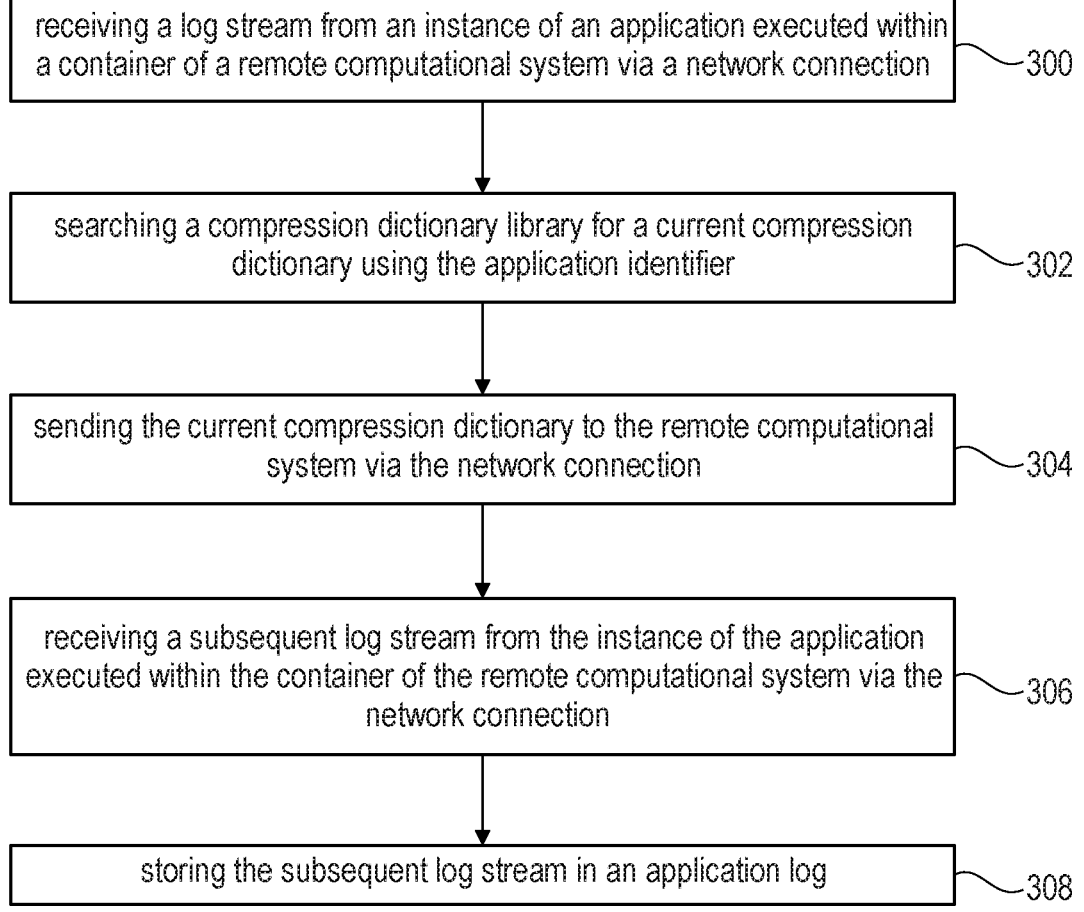

receiving a log stream from an instance of an application executed within a container of a remote computational system via a network connection —300 searching a compression dictionary library for a current compression dictionary using the application identifier —302 sending the current compression dictionary to the remote computational system via the network connection —304 receiving a subsequent log stream from the instance of the application executed within the container of the remote computational system via the network connection —306 storing the subsequent log stream in an application log —308

Fig. 3

ADAPTIVE LOG COMPRESSION

BACKGROUND

The present invention relates to the compression of logs.

When applications are run remotely as cloud or web-based applications there may be one agent running per machine that collects and forwards logs for all containers implemented on that machine, or more generally, for all processes that are running on the machine.

SUMMARY

In one aspect the invention provides for a computer-implemented method of log compression. The method comprises receiving a log stream from an instance of an application executed within a container of a remote computational system via a network connection. The log stream comprises metadata. The metadata comprises an application identifier. The application identifier uniquely identifies executable code of the application. The method further comprises searching a compression dictionary library for a current compression dictionary using the application identifier. The application identifier uniquely identifies the current compression dictionary for the application. The method further comprises sending the current compression dictionary to the remote computational system via the network connection.

In another aspect the invention provides for a computer program product comprising computer-readable storage medium having computer-readable program code embodied therewith. The computer-readable program code is configured to implement a method comprising receiving a log stream from an instance of an application executed within a container of a remote computational system via a network connection. The log stream comprises metadata. The metadata comprises an application identifier. The application identifier uniquely identifies executable code of the application. The method further implemented by the computer-readable code further comprises searching a compression dictionary library for a current compression dictionary using the application identifier. The application identifier uniquely identifies the current compression dictionary for the application. The computer-readable program code is further configured to send the current compression dictionary to the remote computational system via the network connection.

In another aspect the invention provides for a computer system that comprises a process configured for controlling the computer system. The computer system further comprises a memory storing machine-executable instructions. Execution of the instructions causes the process to receive a log stream from an instance of an application executed within a container of a remote computational system via a network connection. The log stream comprises metadata. The metadata comprises an application identifier. The application identifier uniquely identifies executable code of the application. Execution of the instructions further causes the processor to search a compression dictionary library for a compression dictionary using the application identifier. The application identifier uniquely identifies the compression dictionary for the application. The execution of the instructions further causes the processor to send the compression dictionary to the remote computational system via the network connection.

BRIEF DESCRIPTION OF THE DRAWINGS

In the following embodiments of the invention are explained in greater detail, by way of example only, making reference to the drawings in which:

FIG. 1 illustrates an example of a computing environment.

FIG. 3 shows a flow chart which illustrates a method of using the computing environment illustrated in FIGS. 1 and 2.

DETAILED DESCRIPTION

Figure 2:
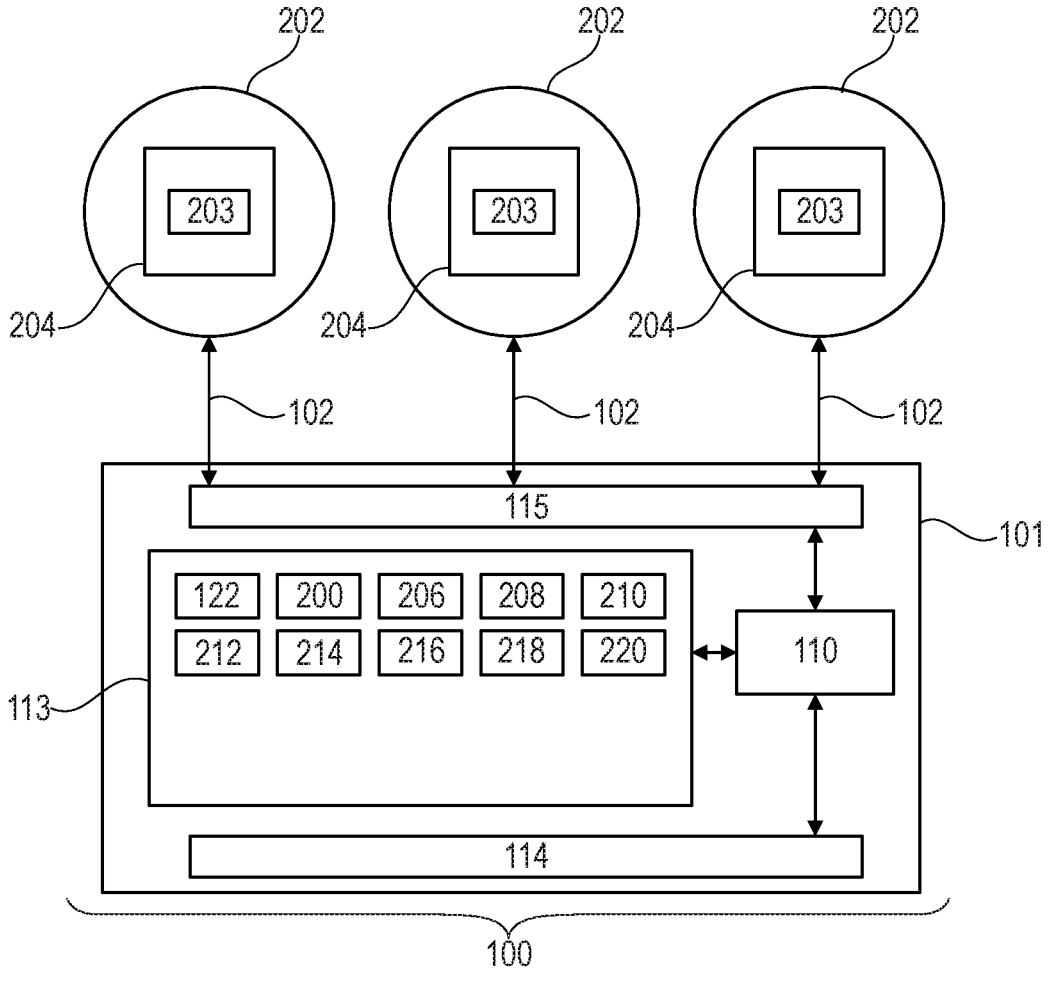
FIG. 2 shows a further view of the computing environment illustrated in FIG. 1.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Examples may provide for a computer-implemented method of log compression. The method comprises receiving a log stream from an instance of an application executed within a container of a remote computational system via a network connection. The log stream may be data which is provided by the application. It may for example provide such data as debugging information, operations performed by the application, operations performed used by controlling other programs or applications by the application, as well as data which may be useful for debugging or monitoring the progress or operation of the application. The container may for example be used to implement a virtual machine on the remote computational system. As the remote computational system is accessible via a network connection the log stream may actually be received in many multiple instances from multiple instances of the application.

The log stream comprises metadata. The metadata comprises an application identifier. The application identifier uniquely identifies the executable code of the application. For example, there may be different versions of the application. The identifier may be used to uniquely identify a particular version of the application.

This may for example be useful because the metadata supplied by the application may vary from version-to-version of the application. By using the application identifier to uniquely identify the executable code of the application it is possible to make a reference to a particular version of the application.

The method further comprises searching a compression dictionary library for a current compression dictionary using the application identifier. The application identifier uniquely identifies the current compression dictionary for the application. As various versions of the application may have differences in their metadata which is supplied, it may therefore be of benefit to have a compression dictionary which is tailored or specific to the particular executable version of the application. The method further comprises sending the current compression dictionary to the remote computational system via the network connection. This may be beneficial because the current compression dictionary is provided to the instance of the application. As the current compression dictionary is provided the current compression dictionary may be used by this application to compress the log stream. This may have the benefit of reducing the amount of traffic over the network connection. This may also enable a larger quantity of metadata to be included in the log stream. Another advantage is that this may also reduce the computational load or need of the remote computational system. Going through and continually determining the compression dictionary by each individual remote computer system may consume large amounts of machine resources. In this example, the current compression dictionary for the particular application is simply provided and this may eliminate the need by the computational system to calculate a compression dictionary suitable for compressing the log stream.

Examples may provide a method to significantly (possibly by orders of magnitude) shrink the network traffic for data transfer of logs in web based applications, such a cloud native system. The method may provide for optimized, low overhead compression methods per log stream that is based on current compression dictionary, which may be a diction- ary being generated per unique component (process and version) such that log streams for each process can be compressed at maximum efficiency with low overhead.

Shrinking the amount of network traffic due to logging activities, which in some examples may be a predominant source of traffic in any software as a service system may allow the more efficient operation of instances of the appli- cation and potentially at lower cost. Not only do examples possibly minimize network traffic for each machine which hosts the application that is sending log streams to an external system, but also the amount of traffic that needs to be handled by this central system is shrinking significantly allowing to handle more logs with less resources.

Similarly, examples may provide a differentiated logging application or service to customers in Hybrid Cloud setups.

The problem of limited network bandwidth is exemplified in edge computing or internet of things scenarios, where examples may provide tremendous network traffic savings. Examples may not only be efficient with regards to network bandwidth, but may also minimizes resource consumption for compression on the log provider side.

In another example the method further comprises repeat- edly receiving a subsequent log stream from the instance of the application executed within the container of the remote computational system via the network connection. The sub- sequent log stream is compressed using the current com- pression dictionary. The method further comprises repeat- edly storing the subsequent log stream in an application log.

After the current compression dictionary was sent to the remote computational system the subsequent log streams were then compressed using the current compression dic- tionary. This may have resulted in a reduction in the network traffic on the network connection as well as having reduced the computational load or burden on the remote computa- tional system. The method further comprises repeatedly storing the subsequent log stream in an application log. This may also be beneficial because the reduction in the compu- tational load on the remote computational system as well as the load on the network connection may enable a larger quantity of metadata to be transmitted and stored in the application log.

It may also be noted that the subsequent log stream may also be decompressed and then stored in the application log or it may be left in the compressed state. Decompressing the subsequent log stream may have the advantage that it is no longer necessary to store the accompanying compression dictionary for subsequent decompression of the subsequent log stream. Maintaining the subsequent log stream in the compressed state may have the benefit that a larger quantity of metadata can be stored before local memory storage is filled with the subsequent log stream. One advantage of a compression dictionary is that the compressed material is decompressed by comparing to this dictionary, which means that the compressed subsequent log stream may be decom- pressed using a random access to retrieve certain parts of the subsequent log stream. This may enable the storage of the subsequent log stream in the compressed form.

In another example the method further comprises decom- pressing the subsequent log stream with the current com- pression dictionary before storage in the application log. This example may be beneficial because it is then no longer necessary to retain the compression dictionary or have it referenced. The time to access the application log and therefore its latency may also be reduced if it is stored in the decompressed form.

In another example the method further comprises caching the decompressed subsequent log stream. The method fur- ther comprises determining a new compression dictionary using the cached decompression subsequent log stream. The method further comprises replacing the current compression dictionary with the new compression dictionary. This for example may include replacing it in the compression dic- tionary library as well as deploying it to the remote com- putational system via the network connection. The caching of the decompressed subsequent log stream may for example be for multiple instances of the application possibly executed within different containers of different remote computational systems. This example may be beneficial because it may provide a means of continually improving the compression dictionary.

In another example the current compression dictionary is replaced with the new compression dictionary if a compres- sion ratio of the new compression dictionary is greater than a compression ratio of the current compression dictionary by more than a predetermined threshold. In this example, if the new compression dictionary is significantly better, for example, by the predetermined threshold, then it is used to replace the current compression dictionary.

In another example the decompressed subsequent log stream is cached for multiple instances of the application. The new compression dictionary is determined using the cached decompressed subsequent log stream from the mul- tiple instances of the application. This may have the effect of greatly or very rapidly improving the quality of the com- pression dictionary.

In another example the method further comprises repeat- edly determining if an application error is present by scan- ning the application log. The method further comprises repeatedly providing a signal if the application error is determined. This example may be beneficial because it may for example provide a means of proactively monitoring what is happening with the application executed within the con- tainer. For example, if there is a service being provided over the internet it may be desirable to detect errors before users detect that there is a problem with the application. This may be greatly enabled by using the compression dictionary. By using the current compression dictionary the amount of traffic which can be sent via the network connection is increased as well as reducing the computational burden on the remote computational system. The synergy of these two may provide more metadata to be scanned in the application log. This may for example aid in detecting application errors more easily or more rapidly.

The signal may take different forms in different examples. For example, a warning may be sent to an operator of a system. In other examples the signal may also cause the behavior of the application to be changed such that it starts recording even more detail and sending more metadata over the network connection to be logged.

In another example the scanning of the application log comprises searching for a predetermined log entry in the application log. This may be beneficial because if there are particular entries in the application log this may trigger the providing of the signal.

In another example the scanning of the application log comprises searching for a predetermined pattern of log entries. Likewise, this may be used to detect a certain pattern of log entries which should be used to trigger or provide the signal.

In another example the scanning of the application log comprises detecting an increase in the rate of log entries above a predetermined log entry increase threshold. For example, if the application or many instances of the application begin sending a larger amount of log entries, this may indicate that there is a problem.

In another example the scanning of the application log comprises detecting a decrease in the rate of log entries below a predetermined log entry decrease threshold. This may for example indicate that the application or possibly many instances of the application are no longer functioning properly and are therefore producing fewer log entries.

In another example the scanning of the application log entry comprises comparing a portion of the application log to a predetermined set of criteria. For example, various metrics of the metadata may be used to trigger the providing of the signal.

In another example the scanning of the application log comprises inputting the portion of the application log into a pattern recognition neural network configured to detect the application error. For example, various words or codes may be tokenized and then used and placed into a pattern recognition neural network such as a convolutional neural network, a fully connected neural network, or even a recurrent neural network to detect the application error.

In another example the scanning of the application log comprises inputting the subsequent log stream into a recurrent neural network configured to detect the application error. In both the pattern recognition neural network and the recurrent neural network, training data may be collected by storing examples of log streams and then labeling them as indicating a problem or not.

In another example the scanning of the application log comprises inputting the subsequent log stream into a large language model that is configured to detect the application error.

A large language model (LLM) as used herein encompasses a neural network architecture, typically built up of transformers (encoders and decoders) with self-attention layers and residual connections, that is a language model that has been trained using unlabeled text using self-supervised or semi-supervised learning. Typically, LLMs are trained using billions of words. LLMs may for example be trained in an autoregressive form where given a segment of text the model predicts the next word (token) or words (tokens). Another mode of training is where words or tokens within a sentence are missing and the LLM predicts the missing words or tokens. Both types of LLMs may be configured to be used in the so-called prompting paradigm where a text query or statement is input into the LLM and the LLM outputs a completion or statement. The LLMs described herein are configured to operate in the prompting paradigm. Example LLMs are generative pre-trained transformers (GPT)-3, GPT-4, bidirectional encoder representations from transformers (BERT), large language model meta AI (LLaMA), and others. The LLM may be trained for specific tasks using reinforcement learning or by reinforcement learning from human feedback (RLHF). The output of a preexisting LLM may be adjusted using fine-tuning. In fine-tuning a new set of weights connecting the final layer of the language model may be trained with specific data. Typically, this is done by freezing the other weights (other than the final output layer) in the neural network so that only the final output and format is affected.

The LLM may be fine tuned by using historical log streams as input and manually providing output during the fine-tuning process.

In another example the method further comprises instructing the remote computational system to send the subsequent log stream decompressed via the network connection if the current compression dictionary for the application identifier is missing from the compression dictionary library. This may for example indicate that for a particular application a compression dictionary has not yet been stored in the compression dictionary library. In some instances, it may be beneficial to proceed without any compression. This may for example allow the collection of log streams to determine a compression dictionary.

In another example the method further comprises retrieving a prior application identifier from an application identifier database if the application identifier is missing from the compression dictionary library. The method further comprises searching for a prior compression dictionary in the compression dictionary library using the prior application identifier. The method further comprises sending the prior compression dictionary to the remote computational system as the current compression dictionary via the network connection. This example may be beneficial because sometimes, when the executable code of the application is updated, the contents of the log stream may change only slightly. It may therefore be beneficial to use the prior compression dictionary until a new compression dictionary can be computed for the particular version of the application.

In another example the method further comprises caching the decompressed subsequent log stream. The method further comprises determining the current compression dictionary using the cached decrypted subsequent log stream. The method further comprises placing the current compression dictionary into the compression dictionary library. The method further comprises sending the current compression dictionary to the remote computational system via the network connection.

The method further comprises instructing the remote computational system to compress the subsequent log stream for the application using the current compression dictionary via the network connection. In this example determining the current compression dictionary using the cached decrypted subsequent log stream may include calculating the current compression dictionary. This embodiment may therefore provide for a means of providing a new current compression dictionary and then integrating it both into the compression dictionary library and then deploying it to all computational systems that may have an instance of the application being executed.

In another embodiment the decompressed subsequent log stream is cached for multiple instances of the application. The current compression dictionary is determined using the cached decompressed subsequent log stream from the multiple instances of the application. Using the cached decompressed subsequent log stream from multiple instances of the application may be beneficial because it may provide for generation of the current compression dictionary more rapidly as well as providing for a higher compression ratio because there is more data available.

In another example the method further comprises generating the application identifier upon a first time of receiving the log stream from the application. The method further comprises reusing the application identifier upon a subsequent encounter with the log streams from the application. This may for example be from different instances of the application. This example may be beneficial because it may provide for a means of initiating the application identifier.

In another example the method is applied to multiple instances of the application executed within different containers simultaneously. This may be beneficial because there may therefore be large savings in computational effort on the part of the various computational systems executing the application as well as reducing a large amount of network traffic generated by the log streams.

In another example the application is a cloud native application.

In another example the application is a service application.

In another example the application is a web application.

In another example the application is a shopping cart application.

In another example the application is a database application.

In another example the application is a graphQL application.

In another example the application is a simple object access protocol.

In another example the application is a representational state transfer (REST) application programming interface (API).

In another example the application has immutable executable code. By immutable this means that across different instances being executed on different containers within different remote computational systems the executable code is the same. This may have the benefit that because the executable code is identical the type of metadata generated by instances should also be identical. This may enable the use of the same current compression dictionary for all instances of the application.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 shows a computing environment 100 which depicts an example of an environment for the execution of at least some of the computer code involved in performing the inventive methods, such as a compression dictionary library 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods.

In computing environment 100, at least some of the instructions for implementing a method of using the compression dictionary library 200 may be stored in persistent storage 113. For example, instructions may be used to control the computing environment to receive a log stream from an instance of an application executed within a container of a remote computational system via a network connection. The log stream comprises metadata which further comprises an application identifier. The application identifier uniquely identifies executable code of the application. The instructions further control the computing system to search the compression dictionary library 200 for a compression dictionary using the application identifier. The application identifier uniquely identifies the compression dictionary for the application. Instructions may further be used to send the compression dictionary to the remote computational system via the network connection.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a further view of the computing environment 100 of FIG. 1. The wide area network 102 forms a network connection 102 between the network module 115 and several remote computational systems 202. The remote computational systems 202 each are executing or provide a container 204 for writing an instance of the application 203.

The storage 113 is further shown as storing a log stream 206 received from one or more of the remote computational systems 202 for the application 203. The storage 113 is further shown as containing metadata 208 that was extracted from one of the log streams 206; it contains an application identifier 210 which immutably identifies the application 203. The storage 113 is further shown as containing a current compression dictionary 212 that was retrieved from the compression dictionary library 200 using the application identifier 210. The current compression dictionary 212 can then be sent to the remote computational systems 202. It can be used to compress subsequent log streams 214. A subsequent log stream 214 is shown as also being stored in the persistent storage 113. The persistent storage 113 is further shown as containing application log 216 where the subsequent log stream 214 is stored. The subsequent log stream 214 may either be decompressed and then stored in the application log 216 or it may also be stored in a compressed state.

The persistent storage 113 is shown as optionally containing a log scanning module 218 that is able to read the application log 216 and determine if an application error is present or recorded in the application log 216. If the application error is detected the log scanning module 218 can provide a signal 220 that can be used to change the behavior or logging behavior of the applications 203 or it may also be used to trigger an investigation or warning about the application log 216.

FIG. 3 shows a flowchart which illustrates a method of operating the computing environment 100 shown in FIGS. 1 and 2. In step 300 the log stream 206 is received from an instance of the application 203 executed within a container 204 of a remote computational system 202 via a network connection 102. In step 302 the compression dictionary library 200 is searched for a current compression dictionary 212 using the application identifier 210. In step 304 the current compression dictionary 212 is sent to the remote computational system 202 via the network connection 102. In step 306 a subsequent log stream 214 is received from the instance of the application 203 executed within the container 204 of the remote computational system 202 via the network connection 102. When it is received, the subsequent log stream has been compressed using the current compression dictionary.

In step 308 the subsequent log stream 214 is stored in the application log 216. In some examples the log scanning module 218 may then be used to scan the application log 216 and to provide the signal 220 if the application error is detected. Steps may be repeated as a continuous loop. An advantage of the method when it is combined with the log scanning module is that there is less latency in detecting the application error and providing the signal. For example, if there are mission critical applications or applications which are used in commerce it may be beneficial to be able to detect when there are problems before the users of the system are aware that there is a problem.

Figure 4:
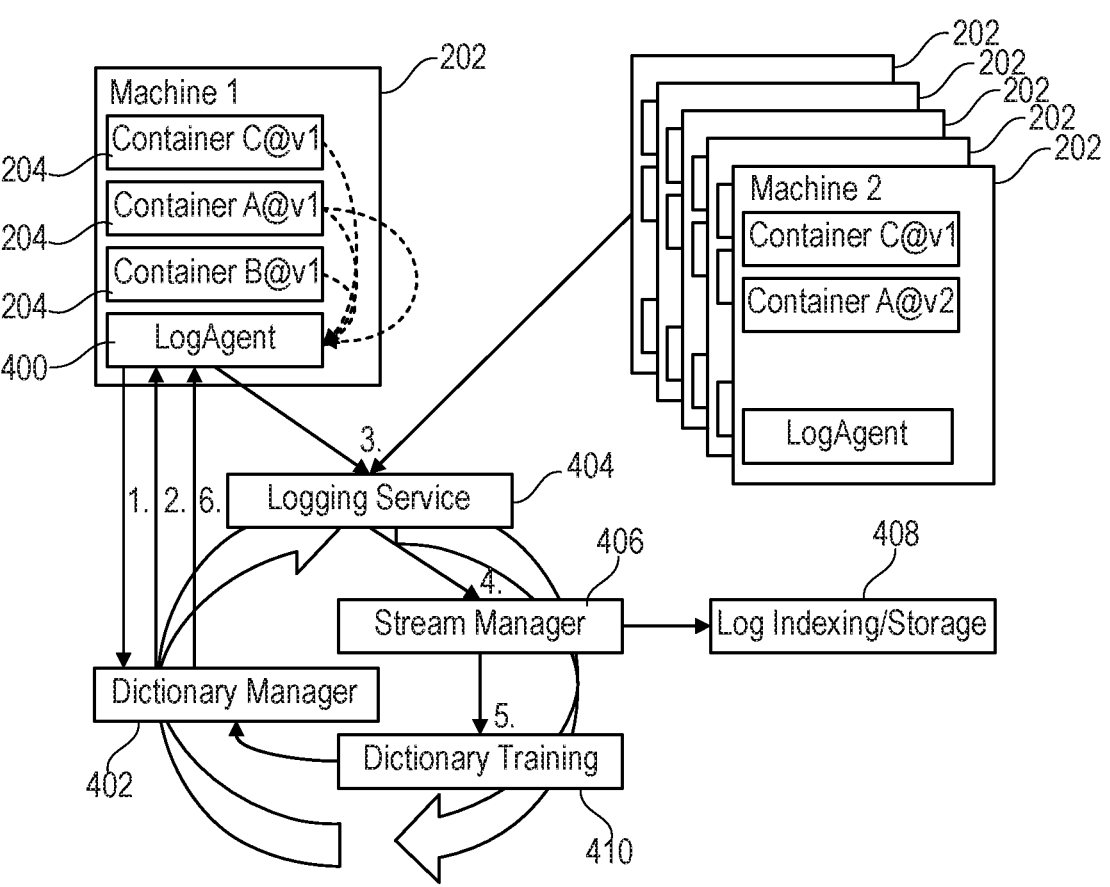
FIG. 4 illustrates and adaptive log compression system using components of the computing environment illustrated in FIG. 2.

FIG. 4 illustrates an adaptive log compression system. The adaptive log compression system illustrates the functionality of some software components which may be implemented on the computing environment 100 illustrated in FIGS. 1 and 2. The various software components need not be provided in the discreet components as described but they are simply used to explain one example the operation of the adaptive log compression system. The functionality of various software components may be combined or distributed differently. There are a number of remote computational systems 202 that may host one or more containers 204. The containers may or may not contain an instance of the application 203. Running on each of the remote computational systems 202 is shown a log agent 400. The log agent 400 is a software component which may be used to receive the current compression dictionary 212 and then encrypt log streams 206 into the subsequent log streams 214 before sending them to the computing environment 100. The arrows labeled 1, 2, 3, 4, 5, and 6 illustrate exemplary actions taken by this system.

Arrow 1 represents the log agent 400 sending a dictionary manager 402 to the log stream 206. When a new log-stream appears on a machine (including the log agent 400 itself) the log agent 400 queries the dictionary manager 402 using the workload metadata (metadata 208) to obtain the most suitable dictionary (current compression dictionary 212). For a containerized application, the metadata could be the Open Container Initiative (OCI) image metadata. For the operating system image, the Software Bill of Materials (SBOM) of the image could be a suitable representation of metadata.

In arrow 2, as illustrated in this Fig, the dictionary manager 402 then retrieves the current compression dictionary 212 from the compression dictionary library 200 using the application identifier 210. The dictionary manager 402 may send the compression dictionary 212 to the log agent 400. In other words, the dictionary manager 402 fetches dictionaries suitable for the workload. This is done by generating a workload identifier (application identifier 210) from all or parts of the provided metadata 208). That identifier is then further used to lookup a dictionary from storage as follows:

a. If there is a suitable dictionary it's returned to the calling log agent.

b. If no direct match is found, the manager may possibly select the next best dictionary based on the version relationship between metadata that has been provided in the request and metadata for each dictionary. An example for this mechanism would be to select the dictionary of the previous version of an application when a new version is deployed the first time. The relation is devised from time correlation (same OCI image name, different creation date) or versioning information (2.2.0 is a newer version of 2.0.3).

c. If no dictionary is found, the agent is instructed with the workload identifier and may proceed sending logs without compression.

In arrow 3 the log agent 400 may establish a channel by sending log streams to logging service 404 over the potentially multiplex connection using one of the following protocols: a.) agent indicates the workload Id that this log-stream is representing or b.) agent optionally indicates the dictionary version that is used to compress all further messages on this channel.

Arrow 4 represents the stream manager 406 receiving the service side of the protocols from logging service 404 and performs the following actions: The stream manager 406 receives the server side of this protocol and may perform the following actions:

a. Unwrap and uncompress log-streams.

b. Send the unwrapped data to downstream log ingestion systems (e.g. Loki).

c. Tracks compression ration per log-stream.

If the compression ratio deviates more than a configurable threshold (i.e., percent change greater than a threshold) from the ratio that has been calculated during training (or if the log-stream is not compressed at all) a dictionary training job is started and fed with the uncompressed log-stream.

Arrow 5 represents various dictionary training jobs that may be performed using data in log indexing/storage 408. Dictionary training jobs consume a log-stream in order to build an efficient compression dictionary by buffering a larger portion (e.g., 1 Mb) of the log-stream and deriving a dictionary the training job sends a new dictionary to the dictionary manager once the compression ration doesn't improve further when another chunk (e.g., 1 Mb) is added to the training data set. The dictionary training module 410 may push a new dictionary if better compression is available to the dictionary manager 402, which may then, as shown by arrow 6, push the new compression dictionary to the log agent 400. For example, the dictionary manager could send a push notification to all computational systems 202 with a container 204 when a new dictionary has been promoted, the notification instructs the agents to end the current log-stream for the workload and start a new one using the new dictionary (the loop begins again with 1.).

Various examples may possibly be described by one or more of the following features in the following numbered clauses:

Clause 1. A computer implemented method of log compression, wherein the method comprises:

receiving a log stream from an instance of an application executed within a container of a remote computational system via a network connection, wherein the log stream comprises metadata, wherein the metadata comprises an application identifier, wherein the application identifier uniquely identifies executable code of the application;

searching a compression dictionary library for a current compression dictionary using the application identifier, wherein the application identifier uniquely identifies the current compression dictionary for the application; and sending the current compression dictionary to the remote computational system via the network connection.

Clause 2. The computer implemented method of clause 1, wherein the method further comprises repeatedly:

receiving a subsequent log stream from the instance of the application executed within the container of the remote computational system via the network connection, wherein the subsequent log stream is compressed using the current compression dictionary; and storing the subsequent log stream in an application log.

Clause 3. The computer implemented method of clause 2, wherein the method further comprises decompressing the subsequent log stream with the current compression dictionary before storage in the application log.

Clause 4. The computer implemented method of clause 3, wherein the method further comprises:

caching the decompressed subsequent log stream;

determining a new compression dictionary using the cached decompressed subsequent log stream; and replacing the current compression dictionary with the new compression dictionary.

Clause 5. The computer implemented method of clause 4, wherein the current compression dictionary is replaced with the new compression dictionary if a compression ratio of the new compression dictionary is greater than a compression ratio of the current compression dictionary by more than a predetermined threshold.

Clause 6. The computer implemented method of clause 4 or 5, wherein the decompressed subsequent log stream is cached for multiple instances of the application, and wherein the new compression dictionary is determined using the cached decompressed subsequent log stream from the multiple instances of the application.

Clause 7. The computer implemented method of any one of clauses 2 through 6, wherein the method further comprises repeatedly:

determining if an application error is present by scanning the application log;

providing a signal if the application error if the application error is determined.

Clause 8. The computer implemented method of clause 7, wherein scanning the application log comprises any one of the following: searching for a predetermined log entry in the application log, searching for a predetermined pattern of log entries, detecting an increase in a rate of log entries above a predetermined log entry increase threshold, detecting a decrease the rate of log entries below a predetermined log entry decrease threshold, comparing a portion of the application log to a predetermined set of criteria, inputting the portion of the application log into a pattern recognition neural network configured to detect the application error, inputting the subsequent log stream into a recurrent neural network configured to detect the application error, inputting the subsequent log stream into a large language model configured to detect the application error, and combinations thereof.

Clause 9. The computer implemented method of any one of clauses 2 through 8, wherein the method further comprises instructing the remote computational to send the subsequent log stream decompressed via the network connection if the current compression dictionary for the application identifier is missing from the compression dictionary library.

Clause 10. The computer implemented method of any one of clauses 2 through 8, wherein the method further comprises:

retrieving a prior application identifier from an application identifier database if the application identifier is missing from the compression dictionary library;

searching for a prior compression dictionary in the compression dictionary library using the prior application identifier; and sending the prior compression dictionary to the remote computational system as the current compression dictionary via the network connection.

Clause 11. The computer implemented method of clause 9 or 10, wherein the method further comprises:

caching the decompressed subsequent log stream;

determining the current compression dictionary using the cached decrypted subsequent log stream;

placing the current compression dictionary into the compression dictionary library;

sending the current compression dictionary to the remote computational system via the network connection; and instructing the remote computational system to compress the subsequent log stream for the application using the current compression dictionary via the network connection.

Clause 12. The computer implemented method of clause 11, wherein the decompressed subsequent log stream is cached for multiple instances of the application, and wherein the current compression dictionary is determined using the cached decompressed subsequent log stream from the multiple instances of the application.

Clause 13. The computer implemented method of any one of clauses 9 through 12, wherein the method further comprises:

generating the application identifier upon a first time of receiving the log stream from the application; and reusing the application identifier upon a subsequent encounter with log streams from the application.

Clause 14. Them method according to any one of the preceding clauses, wherein the method is applied to multiple instances of the application executed within different containers simultaneously.

Clause 15. The method according to any one of the preceding clauses, wherein the application identifier is identical for every instance of the application.

Clause 16. The method according to any one of the preceding clauses, wherein the application is any one of the following: a cloud native application, a software as a service application, a web application, a shopping cart application, a database application, a graphQL application, a Simple Object Access Protocol, and a REpresentational State Transfer-Application Programming Interface (REST-API).

Clause 17. The method according to any one of the preceding clauses, wherein the application has immutable executable code.

Clause 18. A computer program product comprising a computer-readable storage medium having computer-readable program code embodied therewith, said computer-readable program code configured to implement the method of any one of clauses 1 through 18.

Clause 19. A computer system comprising:

a processor configured for controlling said computer system; and a memory storing machine executable instructions, execution of said instructions causes said processor to:

receive a log stream from an instance of an application executed within a container of a remote computational system via a network connection, wherein the log stream comprises metadata, wherein the metadata comprises an application identifier, wherein the application identifier uniquely identifies executable code of the application;

search a compression dictionary library for a compression dictionary using the application identifier, wherein the application identifier uniquely identifies the compression dictionary for the application; and send the compression dictionary to the remote computational system via the network connection.

What is claimed is:

1. A computer implemented method for log compression, the method comprising:

receiving a log stream from an instance of an application executed within a container of a remote computational system via a network connection, wherein the log stream comprises metadata, wherein the metadata comprises an application identifier, wherein the application identifier uniquely identifies executable code of the application;

searching a compression dictionary library for a current compression dictionary using the application identifier, wherein the application identifier uniquely identifies the current compression dictionary for the application;

sending the current compression dictionary to the remote computational system via the network connection; and repeatedly:

receiving a subsequent log stream from the instance of the application, wherein the subsequent log stream is compressed using the current compression dictionary;

decompressing the subsequent log stream with the current compression dictionary;

caching the decompressed subsequent log stream;

determining a new compression dictionary using the cached decompressed subsequent log stream;

replacing the current compression dictionary with the new compression dictionary if a compression ratio of the new compression dictionary is greater than a compression ratio of the current compression dictionary by more than a predetermined threshold; and sending the new compression dictionary to the remote computational system.

2. The computer implemented method of claim 1, wherein the method further comprises repeatedly:

storing the subsequent log stream in an application log.

3. The computer implemented method of claim 1, wherein the decompressed subsequent log stream is cached for multiple instances of the application, and wherein the new compression dictionary is determined using the cached decompressed subsequent log stream from the multiple instances of the application.

4. The computer implemented method of claim 2, wherein the method further comprises repeatedly:

determining if an application error is present by scanning the application log; and providing a signal if the application error if the application error is determined.

5. The computer implemented method of claim 4, wherein scanning the application log comprises any one of: searching for a predetermined log entry in the application log, searching for a predetermined pattern of log entries, detecting an increase in a rate of log entries above a predetermined log entry increase threshold, detecting a decrease in the rate of log entries below a predetermined log entry decrease threshold, comparing a portion of the application log to a predetermined set of criteria, inputting the portion of the application log into a pattern recognition neural network configured to detect the application error, inputting the subsequent log stream into a recurrent neural network configured to detect the application error, inputting the subsequent log stream into a large language model configured to detect the application error, and combinations thereof.

6. The computer implemented method of claim 1, wherein the method further comprises instructing the remote computational system to send the subsequent log stream decompressed via the network connection if the current compression dictionary for the application identifier is missing from the compression dictionary library.

7. The computer implemented method of claim 1, wherein the method further comprises:

retrieving a prior application identifier from an application identifier database if the application identifier is missing from the compression dictionary library;

searching for a prior compression dictionary in the compression dictionary library using the prior application identifier; and sending the prior compression dictionary to the remote computational system as the current compression dictionary via the network connection.

8. The computer implemented method of claim 6, wherein the method further comprises:

caching the decompressed subsequent log stream;

determining the current compression dictionary using the cached decompressed subsequent log stream;

placing the current compression dictionary into the compression dictionary library;

sending the current compression dictionary to the remote computational system via the network connection; and instructing the remote computational system to compress the subsequent log stream for the application using the current compression dictionary via the network connection.

9. The computer implemented method of claim 8, wherein the decompressed subsequent log stream is cached for multiple instances of the application, and wherein the current compression dictionary is determined using the cached decompressed subsequent log stream from the multiple instances of the application.

10. The computer implemented method of claim 1, wherein the method further comprises:

generating the application identifier upon a first time of receiving the log stream from the application; and reusing the application identifier upon a subsequent encounter with log streams from the application.

11. The computer implemented method of claim 1, wherein the method is applied to multiple instances of the application executed within different containers simultaneously.

12. The computer implemented method of claim 1, wherein the application identifier is identical for every instance of the application.

13. The computer implemented method of claim 1, wherein the application is selected from the group consisting of a cloud native application, a software as a service application, a web application, a shopping cart application, a database application, a graphQL application, a Simple Object Access Protocol, and a Representational State Transfer-Application Programming Interface (REST-API).

14. The computer implemented method of claim 1, wherein the application has immutable executable code.

15. A computer program product comprising one or more computer-readable tangible storage medium and program instructions stored on at least one of the one or more tangible storage medium, the program instructions executable by a processor capable of performing a method, the method comprising:

receiving a log stream from an instance of an application executed within a container of a remote computational system via a network connection, wherein the log stream comprises metadata, wherein the metadata comprises an application identifier, wherein the application identifier uniquely identifies executable code of the application;

searching a compression dictionary library for a current compression dictionary using the application identifier, wherein the application identifier uniquely identifies the current compression dictionary for the application;

sending the current compression dictionary to the remote computational system via the network connection; and repeatedly:

receiving a subsequent log stream from the instance of the application, wherein the subsequent log stream is compressed using the current compression dictionary;

decompressing the subsequent log stream with the current compression dictionary;

caching the decompressed subsequent log stream;

determining a new compression dictionary using the cached decompressed subsequent log stream;

replacing the current compression dictionary with the new compression dictionary if a compression ratio of the new compression dictionary is greater than a compression ratio of the current compression dictionary by more than a predetermined threshold; and sending the new compression dictionary to the remote computational system.

16. A computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a log stream from an instance of an application executed within a container of a remote computational system via a network connection, wherein the log stream comprises metadata, wherein the metadata comprises an application identifier, wherein the application identifier uniquely identifies executable code of the application;

searching a compression dictionary library for a current compression dictionary using the application identifier, wherein the application identifier uniquely identifies the current compression dictionary for the application;

sending the current compression dictionary to the remote computational system via the network connection; and repeatedly:

receiving a subsequent log stream from the instance of the application, wherein the subsequent log stream is compressed using the current compression dictionary;

decompressing the subsequent log stream with the current compression dictionary;

caching the decompressed subsequent log stream;

determining a new compression dictionary using the cached decompressed subsequent log stream;

replacing the current compression dictionary with the new compression dictionary if a compression ratio of the new compression dictionary is greater than a compression ratio of the current compression dictionary by more than a predetermined threshold; and sending the new compression dictionary to the remote computational system.

* * * * *